United States Patent
Guillard et al.

(10) Patent No.: US 6,821,316 B2
(45) Date of Patent: Nov. 23, 2004

(54) METHOD FOR TREATING A GAS BY ADSORPTION AND CORRESPONDING INSTALLATION

(75) Inventors: Alain Guillard, Paris (FR); Jan-Marc Peyron, Creteil (FR)

(73) Assignee: L'Air Liquide, Societe Anonyme pour l'Etude et, l'Exploitation des Procedes Georges Claude, Paris (FR)

( * ) Notice: Subject to any disclaimer, the term of this patent is extended or adjusted under 35 U.S.C. 154(b) by 8 days.

(21) Appl. No.: 10/250,430

(22) PCT Filed: Dec. 21, 2001

(86) PCT No.: PCT/FR01/04140

§ 371 (c)(1),
(2), (4) Date: Jun. 27, 2003

(87) PCT Pub. No.: WO02/053265

PCT Pub. Date: Jul. 11, 2002

(65) Prior Publication Data

US 2004/0055465 A1 Mar. 25, 2004

(30) Foreign Application Priority Data

Dec. 29, 2000 (FR) .............................................. 00 17319

(51) Int. Cl.$^7$ ............................................. B01D 53/047
(52) U.S. Cl. ............................... 95/96; 95/117; 95/139; 96/112; 96/115; 96/130
(58) Field of Search ............................ 95/96–106, 117, 95/119, 122, 139; 96/112, 115, 130

(56) References Cited

U.S. PATENT DOCUMENTS

| | | | | |
|---|---|---|---|---|
| 4,197,095 A | * | 4/1980 | White et al. | ..................... 95/15 |
| 4,546,442 A | * | 10/1985 | Tinker | ......................... 96/114 |
| 4,941,894 A | * | 7/1990 | Black | ............................. 95/14 |
| 4,981,499 A | * | 1/1991 | Hay et al. | ...................... 95/100 |
| 5,015,271 A | * | 5/1991 | Reiss | ............................. 95/26 |
| 5,080,694 A | * | 1/1992 | Knoblauch et al. | ............ 95/26 |
| 5,085,674 A | * | 2/1992 | Leavitt | .......................... 95/98 |
| 5,104,426 A | * | 4/1992 | Yamada et al. | ................ 95/11 |
| 5,223,004 A | * | 6/1993 | Eteve et al. | .................... 95/98 |
| 5,407,465 A | * | 4/1995 | Schaub et al. | ................. 95/14 |
| 5,571,309 A | * | 11/1996 | Kumar | .......................... 95/99 |
| 5,906,673 A | * | 5/1999 | Reinhold et al. | .............. 95/45 |
| 5,942,025 A | * | 8/1999 | Monereau et al. | ............. 95/98 |
| 5,985,003 A | * | 11/1999 | Hayashi et al. | ............... 95/101 |
| 5,989,313 A | * | 11/1999 | Mize | ............................. 95/10 |
| 6,210,466 B1 | * | 4/2001 | Whysall et al. | ............... 95/100 |
| 6,402,809 B1 | * | 6/2002 | Monereau et al. | ............. 95/14 |
| 6,402,814 B1 | * | 6/2002 | Kraus et al. | .................. 95/106 |
| 2003/0015091 A1 | * | 1/2003 | Xu et al. | ....................... 95/96 |

FOREIGN PATENT DOCUMENTS

EP 0146646 A1 * 7/1985
FR 2777477 A1 * 10/1999 ........... B01D/53/04

* cited by examiner

*Primary Examiner*—Robert H. Spitzer
(74) *Attorney, Agent, or Firm*—Linda K. Russell

(57) ABSTRACT

A method comprising two adsorbers which follow each a phase-shifted cycle successively consisting in an adsorption phase, at high pressure of the cycle, and a regeneration phase, ending in repressurizing of the adsorber.

31 Claims, 3 Drawing Sheets

METHOD FOR TREATING A GAS BY ADSORPTION AND CORRESPONDING INSTALLATION

The present invention relates to a method for treating a gas by adsorption, of the type in which only two adsorbers are used, which each follow the same, but shifted, cycle successively consisting of an adsorption phase, at a high cycle pressure, and of a regeneration phase with depressurization, which ends in the adsorber being repressurized, the method comprising a step of paralleling the adsorbers during which the total gas stream treated is obtained both by treating a first gas flow by at least one adsorber ending its adsorption phase, and treating a second gas flow to be treated by at least one other adsorber starting its adsorption phase.

The invention is especially applicable to the purification of air for distillation.

Such treatment methods are common in order to obtain, for example, a gas free from one or more constituents, considered as impurities with regard to the downstream treatments for which this treated gas is destined. They are implemented by treatment plants comprising at least two adsorbers. Thus air, for example, in order to be able to be distilled, must be thoroughly purified of water and of $CO_2$. Generally, an air distillation unit is fed by a single air stream. This main air stream is purified at a single pressure level, this taking place in at least two bottles of adsorbents, one of which is in adsorption mode, while the other is in regeneration mode.

During the cycle of these two bottles, the two bottles are paralleled in the adsorption phase so as to provide continuity of air going toward the distillation unit. However, it is important to note that, when the bottle which has just been regenerated is returned to adsorption mode in order to produce purified air, a heat peak appears in the purified air at the outlet of this bottle. It is accepted that this temperature increase is due to the adsorption of nitrogen by the adsorber, and is all the more marked the higher the pressure to which the adsorber is subjected. This temperature variation adversely affects the behavior of the elements which are downstream, whether this is the main exchanger of the air distillation unit or a supercharger. In particular, this problem must be solved in the methods referred to as "pump" methods where pressurized liquid oxygen is vaporized by liquefaction of high-pressure air.

EP-A-0146646 and U.S. Pat. No. 4,981,499 show methods of treating gas by adsorption using at least four adsorbers.

One of the aims of the invention is to limit the harmful consequences of this heat peak by proposing a method which is easy to implement and involving few structural modifications of the relevant treatment plants of the prior art.

To this end, the subject of the invention is a method of the aforementioned type, characterized in that the paralleling step is maintained for a predetermined time interval which is very much greater than the switching time of the valves controlling the adsorbers establishing said step, and/or as long as the difference in temperature between that of the total stream and that of at least one of said flows is greater than a predetermined temperature threshold.

According to other features of the invention:
- said predetermined time interval is at least equal to 1 minute;
- said predetermined time interval is at least equal to 2 minutes;
- the first flow rate is varied at least partially during the paralleling step;
- the second flow rate is varied at least partially during the paralleling step;
- the second flow rate is varied in an opposite manner to the variations of the first flow rate;
- the gas is air and the treatment is a purification of this air from water and $CO_2$;
- an adsorber is repressurized by means of a gas repressurization mixture containing at least one gas from air which is optionally dry and/or decarbonated, and a fluid which is richer in oxygen than air;
- for adsorption at a maximum pressure of about 7 bar, the paralleling step is held for at least 1 minute and/or with a temperature threshold of about 20° C.;
- for adsorption at a maximum pressure of about 7 bar, the paralleling step is held for at least 2 minutes and/or with a temperature threshold of about 20° C.;
- for adsorption at a maximum pressure of about 7 bar, the paralleling step is held for at least 2 minutes and/or with a temperature threshold of about 15° C.;
- for adsorption at a maximum pressure of about 7 bar, the paralleling step is held for at least 5 minutes and/or with a temperature threshold of about 15° C.;
- for adsorption at a maximum pressure of about 7 bar, the paralleling step is held for at least 5 minutes and/or with a temperature threshold of about 10° C.;
- for adsorption at a maximum pressure of about 7 bar, the paralleling step is held for at least 10 minutes and/or with a temperature threshold of about 10° C.;
- for adsorption at a pressure of between about 7 and 36 bar, especially between about 20 and 36 bar, the paralleling step is held for at least 2 minutes and/or with a temperature threshold of about 30° C.;
- for adsorption at a pressure of between about 7 and 36 bar, especially between about 20 and 36 bar, the paralleling step is held for at least 5 minutes and/or with a temperature threshold of about 30° C.;
- for adsorption at a pressure of between about 7 and 36 bar, especially between about 20 and 36 bar, the paralleling step is held for at least 5 minutes and/or with a temperature threshold of about 25° C.;
- for adsorption at a pressure of between about 7 and 36 bar, especially between about 20 and 36 bar, the paralleling step is held for at least 10 minutes and/or with a temperature threshold of about 25° C.;
- for adsorption at a pressure of between about 7 and 36 bar, especially between about 20 and 36 bar, the paralleling step is held for at least 10 minutes and/or with a temperature threshold of about 20° C.;
- for adsorption at a pressure of between about 7 and 36 bar, especially between about 20 and 36 bar, the paralleling step is held for at least 15 minutes and/or with a temperature threshold of about 15° C.;
- the adsorbers follow the same phase-shifted cycle of time interval T with an adsorption phase having a time interval of between T/2 (inclusive) and T (not inclusive).

The subject of the invention is also a plant for treating a gas by adsorption in order to implement the method as defined above, of the type comprising a gas feed line; a treated gas discharge line; just two adsorbers which each follow the same, but shifted, cycle successively consisting of an adsorption phase, at a high cycle pressure, and of a regeneration phase with depressurization, which ends in the adsorber being repressurized, the method comprising a step of paralleling the adsorbers during which the total gas stream treated is obtained both by treating a first gas flow to be treated by at least one adsorber ending its adsorption phase, and treating a second gas flow to be treated by at least one other adsorber starting its adsorption phase; and means for connecting the adsorbers to the feed line, to the discharge line, to each other, and possibly to a line routing an oxygen-rich fluid, characterized in that the plant comprises a flow rate regulating device actuating the connection means such that said connection means hold the paralleling step for a predetermined time interval very much longer than the switching time of the valves controlling the adsorbers establishing said step, and/or as long as the temperature difference between that of the total flow and that of at least one of said flows is greater than a predetermined temperature threshold.

According to another feature of the plant, the regulating device comprises a differential temperature sensor for sensing the temperature difference between the total stream and the first flow, and/or between the total stream and the second flow.

Each adsorber comprises a bottle, each one containing either just a molecular sieve or a molecular sieve with alumina, capable of adsorbing the water and $CO_2$ contained in the air.

The invention will be better understood on reading the following description, given solely by way of example, and made with reference to the appended drawings, in which.

Figure 1:
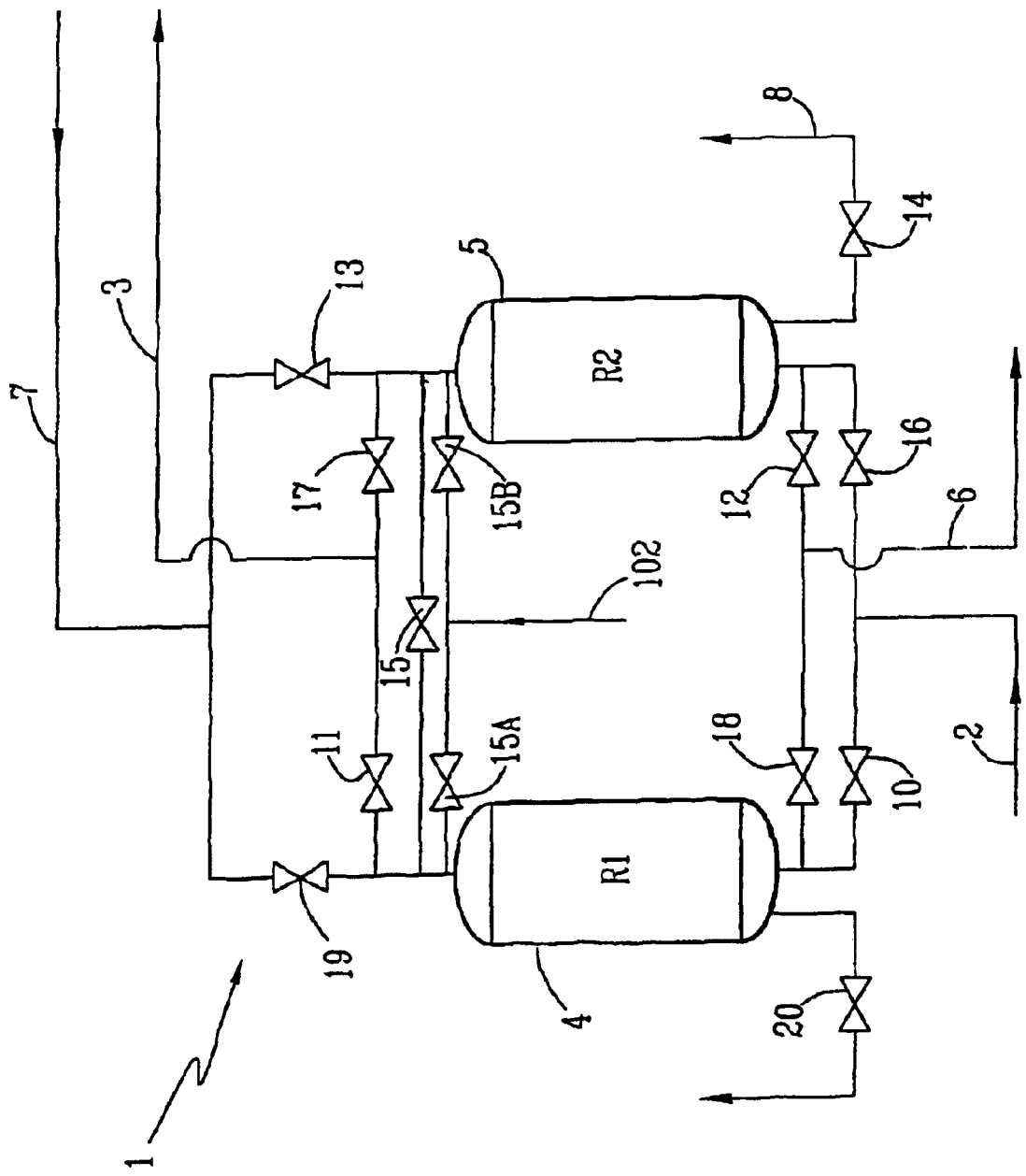
FIG. 1 is a schematic view of a purification plant according to the invention.

FIG. 1 shows a purification plant 1 of an air distillation unit. This plant 1 is suitable for removing impurities, especially water and $CO_2$, contained in a stream of atmospheric air compressed to a pressure of between 3 and 36 bar and carried by a line 2, in order to feed, via a line 3, a main heat exchange line then an air distillation apparatus. The latter elements are not shown in order not to overload FIG. 1. The air distillation unit may, for example, be a double air distillation column producing liquid oxygen which, after pumping, is vaporized in the heat exchange line by condensation of part of the compressed air.

The plant 1 comprises two substantially identical adsorbers R1 and R2. Each adsorber R1, R2 comprises a bottle 4, 5 each one containing a material, for example a molecular sieve optionally with alumina, capable of adsorbing the water and $CO_2$ contained in the air.

The plant 1 further comprises a certain number of connection lines and valves whose arrangement will become apparent now during the description of the method implemented in the plant 1.

Figure 2:
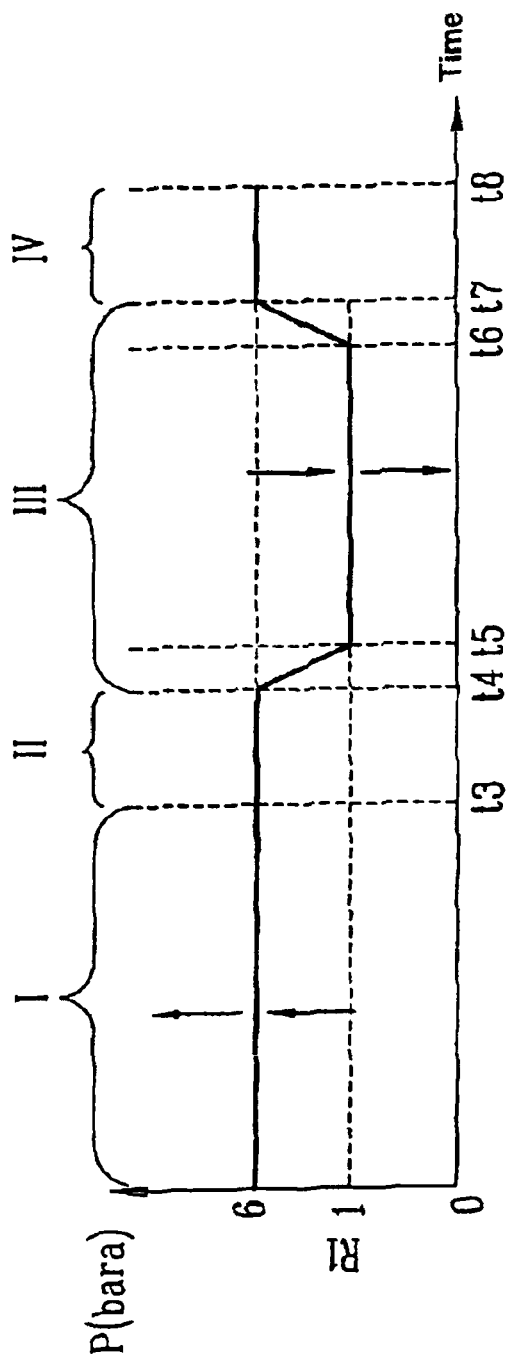
FIG. 2 is a diagram of the cycle of one adsorber of a pair of adsorbers according to the method of the invention.
Figure 3:
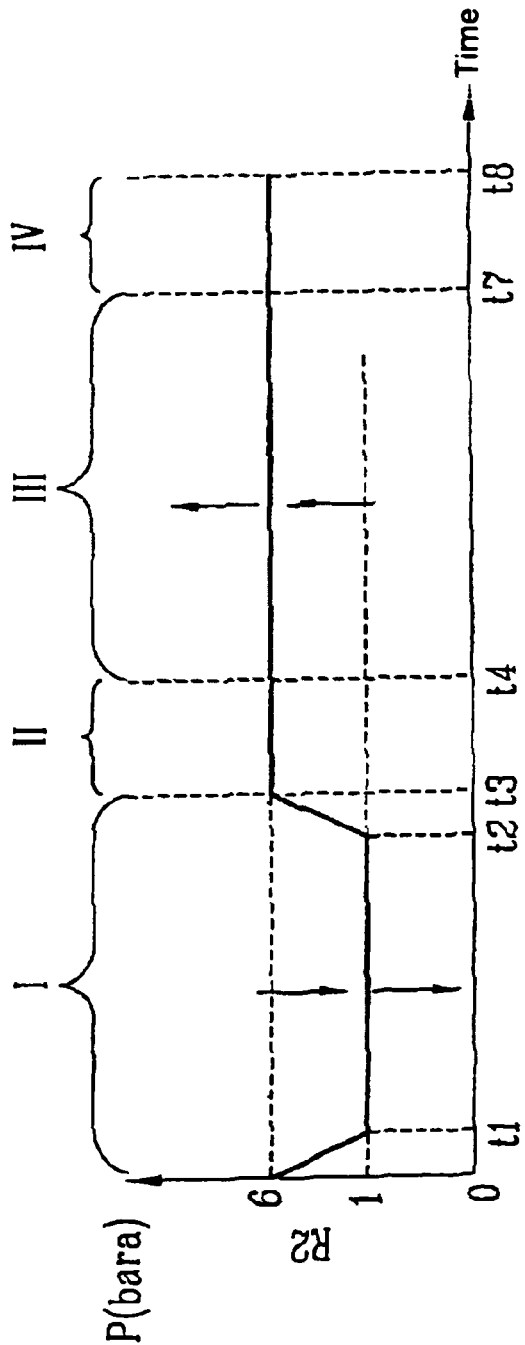
FIG. 3 is a diagram similar to that shown in FIG. 2, but of the other adsorber of the pair in question.

This method is obtained by repetition of a cycle, illustrated in FIGS. 2 and 3, the adsorber R1 following the cycle shown in FIG. 2 and the adsorber R2 following, in parallel, the same, but time-shifted, cycle shown in FIG. 3.

In FIGS. 2 and 3, where the times t are plotted on the x-axes and the absolute pressures P on the y-axes, the lines indicated by the arrows show the movement and destinations of the gas currents and, in addition, the direction of flow in the adsorbers R1 and R2, respectively: when an arrow is in the direction of increasing y (upward in the diagram), the current is referred to as cocurrent, in the adsorber. If the arrow directed downward is located below the line showing the pressure of the adsorber, the current leaves the adsorber via the inlet end of the adsorber; if the arrow directed downward is located above the line showing the pressure, the current enters the adsorber via the outlet end of the adsorber, the inlet and outlet ends always being those of the gas to be treated and of the gas extracted in the production phase.

It should be noted that the time origin is identical in FIGS. 2 and 3, thus allowing the simultaneous reading of both figures for one and the same given instant. The description of the cycle will mainly be based on FIG. 3, it being understood that FIG. 2 shows the same cycle offset by a cycle half-period.

The cycle of FIG. 3, whose period T is, by way of example, equal to 360 minutes for an adsorption pressure substantially equal to 6 bar, comprises four successive steps I to IV.

During step I, that is to say from t=0 to t1=5 minutes, the adsorber R1 is in the adsorption phase, while the main adsorber R2 is in the regeneration phase.

The air of the line 2 is then taken through an open valve 10 in the adsorber R1. The purified air, that is to say the dried and decarbonated air, is then sent back via an open valve 11 to the line 3.

During this time, the adsorber R2 is returned to a pressure substantially equal to atmospheric pressure by opening a valve 12, thus venting the adsorber R2 via a line 6. The valve 12 remains open until t1=5 minutes, that is to say until the pressure inside the bottle 5 of the adsorber R2 is substantially equal to atmospheric pressure.

Next, the valve 12 is closed and waste nitrogen from the distillation unit channeled by a line 7, coming for example from the top of the low-pressure column of the double column, feeds the adsorber R2 via an open valve 13.

This waste nitrogen flows in the adsorber R2 in the regeneration direction, that is to say in the direction opposite to the adsorption direction, thereby regenerating this adsorber saturated during a previous adsorption phase. The waste nitrogen is initially heated, then not heated.

The waste nitrogen conveying the desorbed water and $CO_2$ is then sent from the adsorber R2, via an open valve 14, toward a discharge line 8.

This valve 14 remains open until t2=155 minutes, when it is closed, together with the valve 13, to allow the adsorber R2 to repressurize. This repressurization of R2 consists, from t2 to t3=170 minutes, in bringing the pressure inside the bottle 5 of the adsorber R2 to a value substantially equal to that held in the downstream elements. It is carried out by various envisionable operational adjustments, especially by opening a valve 15 connecting the outlets of the two adsorbers R1 and R2, and possibly by opening a valve 15B connected to the outlet end of R2 and partially feeding the latter with oxygen-rich fluid, for example oxygen coming from the air distillation unit via a line 102.

Step I takes place when the pressure of the adsorber R2 has reached the desired value of 6 bar.

During step II, that is to say from t3 to t4=180 minutes, the adsorber R1 is, as in step I, in adsorption mode.

However, the air from the line 2 is also brought, by means of an open valve 16, into the adsorber R2. The air thus purified is sent via an open valve 17 to the line 3.

During step II, the adsorbers R1 and R2 are therefore both in the adsorption phase in order to purify the air in parallel.

However, the stream of purified air leaving the adsorber R2 is at a temperature much greater than that at the outlet of the adsorber R1, as has been mentioned before. The total air stream routed by the line 3, consisting of the stream leaving R1 and the stream leaving R2, is therefore at a temperature mid-way between that of the stream leaving R1 and that of the stream leaving R2 substantially following a law of mixtures.

This step II of paralleling adsorbers in the adsorption phase takes place for a predetermined time which is much greater than the switching time of the valves controlling the adsorbers R1 and R2 establishing this step, which lasts a few seconds, or even a few tens of seconds, and/or until the temperature mid-way between the total stream is below a previously set temperature, substantially equal to the temperature of the air entering R1 to which temperature is added a temperature tolerance threshold, of about 10° in this example.

During step III, that is to say from t4 to t7=345 minutes, the adsorber R2 is held in the adsorption phase, while the adsorber R1 is in the regeneration phase.

In a similar way to R2 during step I, R1 is successively subjected to:

- a depressurization from t4 to t5=185 minutes by means of closing valves 10 and 11 and opening a valve 18 having a function similar to the valve 12 for R2;
- a flow of waste nitrogen from t5 to t6=335 minutes by closing the valve 18 and opening valves 19 and 20 with functions similar to the valves 13 and 14, respectively, for R2;
- a repressurization from t6 to t7=350 minutes by means of opening the valve 15, and possibly opening a valve 15A, with a function similar to the valve 15B for R2.

At the end of step III, the adsorber R1 is regenerated.

During step IV, that is to say from t7 to t8=360 minutes, the adsorbers R1 and R2 purify the air routed by the line 2 in parallel, both of these adsorbers being in the adsorption phase as in step II.

The step IV continues for the aforementioned predetermined time interval and/or until the temperature of the total stream routed by the line 3 is below the same preset temperature mentioned before, this time substantially equal to the temperature of the air entering R2 and having the same temperature tolerance threshold.

Thus, the extended paralleling of the two adsorbers in the adsorption phase makes it possible to obtain a stream of purified air whose temperature is controlled by mixing a hot stream with a cooler stream. The intensity of the heat peak in the line 3 is attenuated, preventing, or at least sufficiently limiting, the downstream disturbances described above.

By way of numerical example, the jump in temperature at the start of adsorption may be reduced from 70° C. to 15° C. for an air pressure of 30 bar, and from 30° C. to 10° C. for an air pressure of 6 bar.

The method according to the invention is easily implemented by means of suitable adjustment of the valves. It should be noted moreover that repressurization of the oxygen-enriched air, which has the effect of further reducing the temperature of the hot stream, involves slightly correcting the parameters of the method, which is also easy to implement.

Other examples of cycles are summarized in the table below, where the parameters of the paralleling step of the cycle are detailed:

| Adsorption pressure | Temperature threshold | Minimum time interval of the paralleling step |
| --- | --- | --- |
| About 7 bar maximum | 10° C. | About 5 minutes |
| About 7 bar maximum | 15° C. | About 5 minutes |
| About 7 bar maximum | 15° C. | About 2 minutes |
| About 7 bar maximum | 20° C. | About 2 minutes |
| About 7 bar maximum | 20° C. | About 1 minute |
| About 7 to 36 bar | 15° C. | About 15 minutes |
| About 7 to 36 bar | 20° C. | About 10 minutes |
| About 7 to 36 bar | 25° C. | About 10 minutes |
| About 7 to 36 bar | 25° C. | About 5 minutes |
| About 7 to 36 bar | 30° C. | About 5 minutes |
| About 7 to 36 bar | 30° C. | About 2 minutes |

Figure 4:
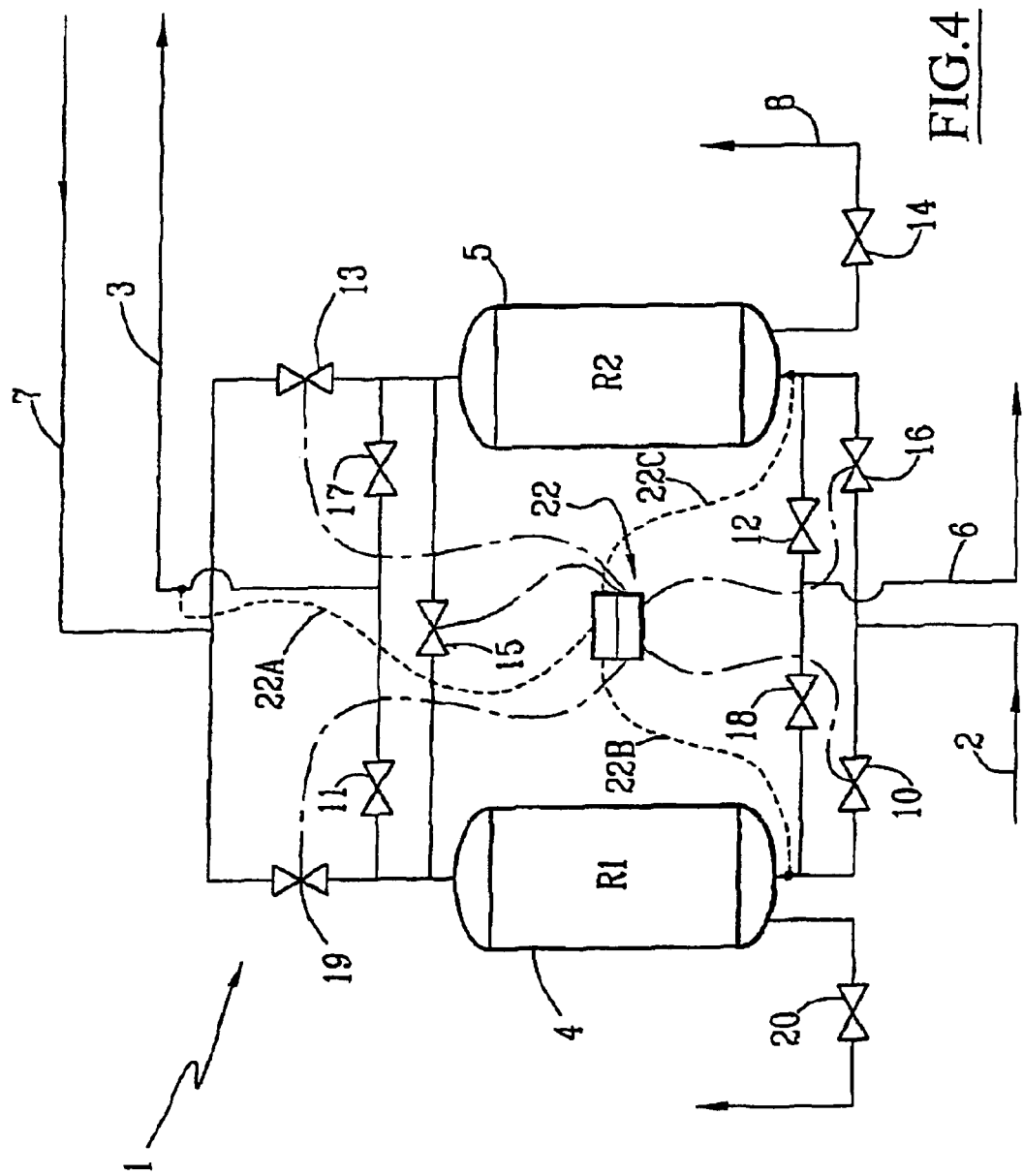
FIG. 4 is a view similar to FIG. 1, but of a variant of the plant according to the invention.

As a variant, and as shown in FIG. 4, the plant 1 comprises a regulating device 22 connected to the valves 10, 11, 15, 16 and 17. This device 22 is capable of regulating the air flow rate passing through each of these valves.

During the step of paralleling the adsorbers, the device 22 actuates, in an opposite manner, the corresponding valves of the two adsorbers, such that the stream routed by the feed line 2 is distributed asymmetrically between the two adsorbers R1 and R2 and/or that the streams leaving each of these adsorbers have proportions which vary with time.

Many adjustments for regulating these valves can be envisaged. By way of example, the detail of one of these adjustments is as follows: during the step of paralleling R2 with R1, that is to say during step II according to the previous numbering, the device 22 controls gradual continual opening of the valve 16 while controlling the gradual continual closing of the valve 10. The stream output by R1, substantially a maximum at the initial time of the paralleling step, thus continually decreases, while, concomitantly, the stream output by R2, substantially zero at the initial time of the paralleling step, continually increases in a similar way.

Advantageously, and as shown in FIG. 4, the device 22 comprises a differential temperature sensor. This sensor comprises three arms 22A, 22B and 22C for measuring the temperature of the gas on the discharge line 3, the inlet end of the adsorber R1 and the inlet end of the adsorber R2, respectively.

This sensor provides the regulating device 22 with the temperature difference between each of its arms, such that the device controls the valves 10, 11, 15, 16 and 17 in an automated manner according to the method of the invention.

As a variant (not shown), the valves 15A and 15B, making it possible to provide oxygen-rich fluid when repressurizing an adsorber, are also connected to the regulating device 22, such that their actuation is controlled and taken into account by this device 22.

Of course, the parameters of the cycle may vary while the plant is in operation.

Furthermore, the time interval for paralleling the adsorbers may change with time, and/or the load of the equipment, and/or differ depending on the adsorber which has just been repressurized.

What is claimed is:

1. A method for treating a gas by adsorption, utilizing two adsorbers (R1, R2), comprising the steps of:
   i) shifting said adsorbers successively in an adsorption phase, at a high cycle pressure;
   ii) regenerating said adsorbers with depressurization;
   iii) repressurizing said adsorbers; and
   iv) paralleling said adsorbers wherein the paralleling step results in a total gas stream treatment that comprises the following steps:

a) treating a first gas flow by at least one adsorber (R1) ending its adsorption phase; and
b) treating a second gas flow to be treated by at least one other adsorber (R2) starting its adsorption phase,
wherein said paralleling step is maintained for either a predetermined time interval longer than the switching time of the valves controlling the adsorbers establishing said paralleling step, or as long as the difference in temperature between that of the total stream and that of at least one of said flows is greater than a predetermined temperature threshold.

2. The method according to claim 1, wherein said predetermined time interval is at least about 1 minute.

3. The method according to claim 2, wherein said predetermined time interval is at least about 2 minutes.

4. The method according to claim 1, wherein the first flow rate is varied at least partially during the paralleling step.

5. The method according to claim 1, wherein the second flow rate is varied at least partially during the paralleling step.

6. The method according to claim 1, wherein the second flow rate is varied in an opposite manner to the variations of the first flow rate.

7. The method according to claim 1, wherein said gas is air and the treatment comprises purification of air from water and $CO_2$.

8. The method according to claim 1, wherein said adsorber is repressurized via a gas repressurization mixture comprising at least one gas from air and a fluid which is richer in oxygen than air.

9. The method according to claim 8, wherein said gas repressurization mixture comprises an air that is either dry, and/or decarbonated.

10. The method according to claim 1, wherein if said adsorption occurs at a maximum pressure of about 7 bar, the paralleling step is held for at least about 1 minute and/or with a temperature threshold of about 20° C.

11. The method according to claim 10, wherein the paralleling step is held for at least about 2 minutes and/or with a temperature threshold of about 20° C.

12. The method according to claim 11, wherein the paralleling step is held for at least about 2 minutes and/or with a temperature threshold of about 15° C.

13. The method according to claim 12, wherein the paralleling step is held for at least about 5 minutes and/or with a temperature threshold of about 15° C.

14. The method according to claim 13, wherein the paralleling step is held for at least about 5 minutes and/or with a temperature threshold of about 10° C.

15. The method according to claim 14, wherein the paralleling step is held for at least about 10 minutes and/or with a temperature threshold of about 10° C.

16. The method according to claim 1, wherein if said adsorption occurs at a pressure from about 7 to about 36 bar, the paralleling step is held for at least about 2 minutes and/or with a temperature threshold of about 30° C.

17. The method according to claim 16, wherein the paralleling step is held for at least about 5 minutes and/or with a temperature threshold of about 30° C.

18. The method according to claim 17, wherein the paralleling step is held for at least about 5 minutes and/or with a temperature threshold of about 25° C.

19. The method according to claim 18, wherein the paralleling step is held for at least about 10 minutes and/or with a temperature threshold of about 25° C.

20. The method according to claim 19, wherein the paralleling step is held for at least about 10 minutes and/or with a temperature threshold of about 20° C.

21. The method according to claim 20, wherein the paralleling step is held for at least about 15 minutes and/or with a temperature threshold of about 15° C.

22. The method according to claim 1, wherein if said adsorption occurs at a pressure from about 20 to about 36 bar, the paralleling step will be held for at least about 2 minutes and/or with a temperature threshold of about 30° C.

23. The method according to claim 22, wherein the paralleling step is held for at least about 5 minutes and/or with a temperature threshold of about 30° C.

24. The method according to claim 23, wherein the paralleling step is held for at least about 5 minutes and/or with a temperature threshold of about 25° C.

25. The method according to claim 24, wherein the paralleling step is held for at least about 10 minutes and/or with a temperature threshold of about 25° C.

26. The method according to claim 25, wherein the paralleling step is held for at least about 10 minutes and/or with a temperature threshold of about 20° C.

27. The method according to claim 26, wherein the paralleling step is held for at least about 15 minutes and/or with a temperature threshold of about 15° C.

28. The method of claim 1, in a plant for treating a gas by adsorption comprising: a gas feed line (2); a treated gas discharge line (3); just two adsorbers (R1, R2) which each follow the same, but shifted, cycle successively consisting of an adsorption phase, at a high cycle pressure, and of a regeneration phase with depressurization, which ends in the adsorber being depressurized, the method comprising a step of paralleling the adsorbers during which the total gas stream treated is obtained both by treating a first gas flow to be treated by at least one adsorber ending its adsorption phase, and treating a second gas flow to be treated by at least one other adsorber starting its adsorption phase; and means (10, 11, 15, 16, 17, 15A, 15B) for connecting the adsorbers to the feed line, to the discharge line, to each other, and possibly to a line routing an oxygen-rich fluid, characterized in that the plant comprises a flow rate regulating device (22) actuating the connection means such that said connection means hold the paralleling step for a predetermined time interval very much longer than the switching time of the valves controlling the adsorbers starting said step, and/or as long as the temperature difference between that of the total flow and that of at least one of said flows is greater than a predetermined temperature threshold.

29. The method according to claim 28, wherein said regulating device (22) comprises a differential temperature sensor (22A, 22B, 22C) for sensing the temperature difference between either the total stream, and the first flow, and/or between the total stream, and the second flow.

30. The method of claim 1, in a plant for treating a gas by adsorption comprising:
i) a gas feed line (2);
ii) a treated gas discharge line (3); and
iii) two adsorbers (R1, R2),
wherein said method comprising the steps of:
 i) shifting said adsorbers successively in an adsorption phase, at a high cycle pressure;
 ii) regenerating said adsorbers with depressurization; and
 iii) paralleling said adsorbers,
wherein said paralleling step results in the treatment of the total gas stream comprising the steps of:
 i) treating a first gas flow by at least one adsorber (R1) ending its adsorption phase; and
 ii) treating a second gas flow to be treated by at least one other adsorber (R2) starting its adsorption phase, wherein a means (10, 11, 15, 16, 17, 15A, 15B) are employed for connecting the adsorbers to the feed line, to the discharge line, to each other, and possibly to a line routing an oxygen-rich fluid;

wherein said plant consists of a flow rate regulating device (22) actuating the connection means; and wherein said connection means hold the paralleling step for either:

a) a predetermined time interval longer than the switching time of the valves controlling the adsorbers starting said step; and/or b) as long as the temperature difference between that of the total flow and that of at least one of said flows is greater than a predetermined temperature threshold.

31. The method according to claim 30, wherein said regulating device (22) comprises a differential temperature sensor (22A, 22B, 22C) for sensing the temperature difference between either the total stream, and the first flow, and/or between the total stream, and the second flow.

* * * * *